Patented Aug. 2, 1927.

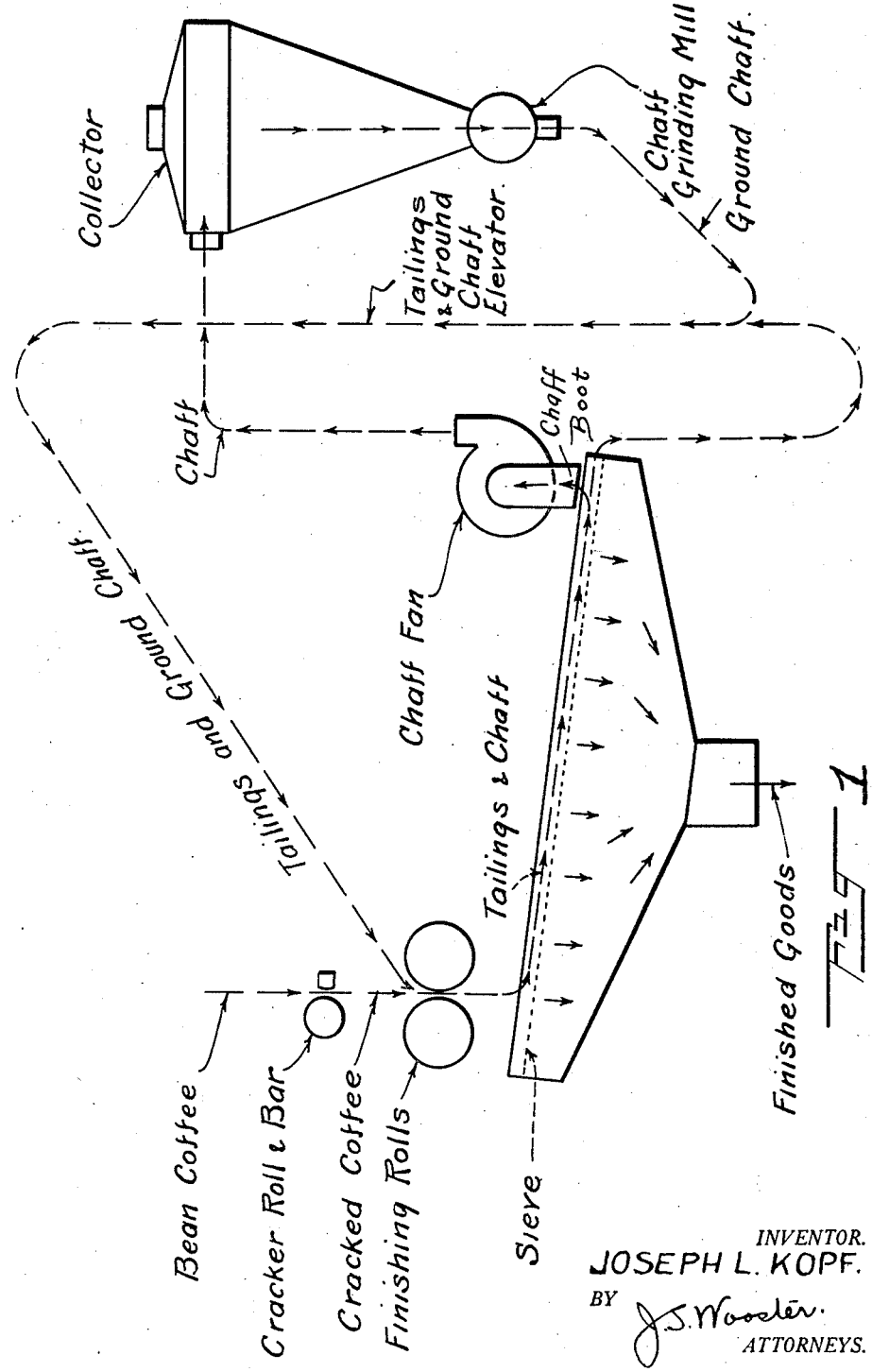

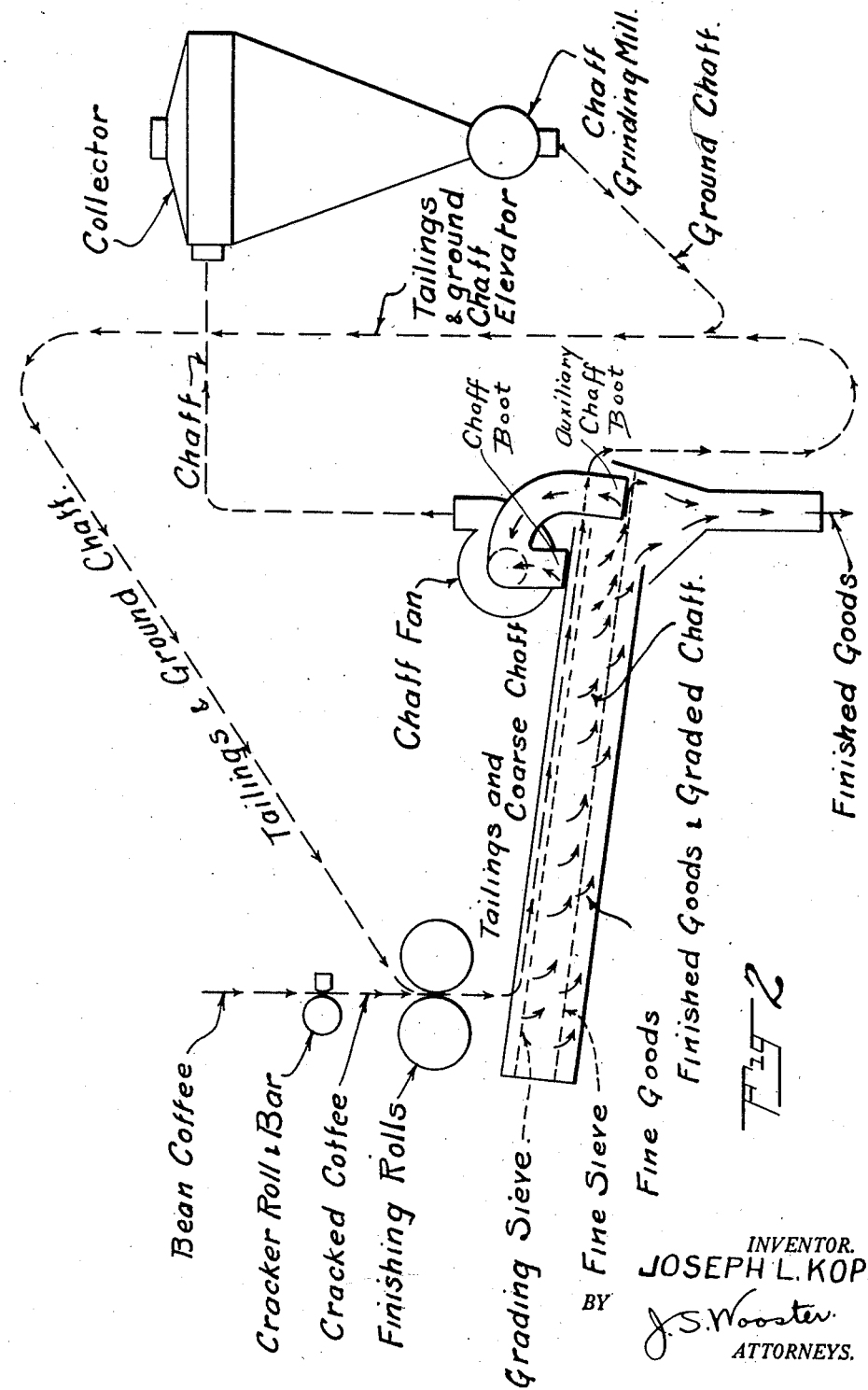

1,637,648

UNITED STATES PATENT OFFICE.

JOSEPH L. KOPF, OF EAST ORANGE, NEW JERSEY, ASSIGNOR TO JABEZ BURNS & SONS, INC., OF NEW YORK, N. Y., A CORPORATION OF NEW YORK.

COFFEE PRODUCT AND METHOD FOR MAKING IT.

Application filed October 1, 1926. Serial No. 138,876.

This invention relates to a comminuted food product made from coffee, coffee substitutes and the like, and to a method of preparing the same.

An object is to produce a food product which is attractive and uniform in appearance, contains the full food values of the material, can be shipped and stored without deterioration and can be used by the consumer to produce the best results.

Another object is to provide a simple and efficient method of manufacture whereby losses are avoided which have hitherto existed in the manufacture of such products.

The usual processes of grinding or cutting roasted coffee and other materials produce loose coarse chaff, which is known to be objectionable. If not removed, it causes stratification in packages or containers, so that the use of such coffee has resulted in variability in the strength of the coffee. Coarse chaff in the ground or cut coffee, especially when it is stored or during transit, permits air to be in the package causing rapid deterioration. Coarse chaff also is objectionable from a sales standpoint because it affects the appearance of the coffee to the consumer. Furthermore when coffee is stored with the coarse chaff in it and then has to be run through weighing machines there is variation in the product, due to the separation of the chaff and cut coffee during storage.

Where the manufacturer, to avoid the above objections, has removed the chaff, especially from cut coffee, it has involved considerable expense because it has to be stored and carried away. Consequently from the manufacturer's standpoint it is preferable to leave the chaff in the coffee.

From the standpoint of the consumer, the presence of properly treated chaff in the coffee results in the retention in the finished product of all the values resident in the roasted article before grinding, causes a combination between the chaff and the finely pulverized coffee which results in a more uniform product, and also produces a better bed for percolation.

There are two general methods of merchandising comminuted coffee to the consumer. One concerns coffee generally known as "steel cut", which is granulated and from which nearly all of the chaff has been removed; and the other is "ground" coffee, finer than the usual "steel cut" coffee and in which the chaff is not removed. The particular kind of coffee to which this invention is preferably applicable is that generally known as "steel cut" but it can apply to any ground coffee if produced in such a way as to properly embody the chaff.

According to this invention, the coarse chaff is loosened from the roasted coffee bean by comminuting, is separated from the main body of the material and given a special separate grinding to reduce it to a size approximating that of the comminuted coffee, and is then returned to the main body of material and uniformly mixed therewith or with the desired amount of other similar material. Generally some pulverized coffee is carried over with the chaff and in passing through the auxiliary grinder adheres to the chaff whereby the light color of the chaff is hidden and the chaff acts as a carrier for the pulverized coffee.

In carrying out the process the bean is first cracked and then granulated and passed to a screen where the fine chaff and coffee pass through. The coarse chaff is removed by a suction from the tailings, generally with some fine coffee, and passed to a separate mill where it is given an additional grinding after which it can either be stored in bins or run back into the tailings elevator which carries the tailings from the screen back to the original granulating or finishing rolls. Sometimes an additional screen is provided to separate even the finer chaff from the ground coffee as hereinafter described.

By removing the chaff from the screens and separately grinding it and then passing it back to the screens, the chaff will repeatedly travel through this circuit until it is so finely divided as to pass through the screens. Thus the finished product going to the bins or to the packages or containers will always contain not only the ground or cut coffee but the chaff coated or uncoated with pulverized coffee in sizes within regulated range as may be desired.

The invention is diagrammatically illustrated in the drawings in which

Fig. 1 shows the apparatus in its preferred form.

Fig. 2 is a similar showing, in which an additional screening operation is performed.

As illustrated, the coffee bean is fed through a cracker bar and roll to finishing rolls where it passes to a screen or sieve. The fine coffee and chaff will pass through the screen to containers or storage bins for the finished product. The tailings and coarse chaff will pass down the sieve and at the lower end thereof the chaff and some of the finer coffee will be drawn up through the suction fan to a collector which will remove the air, permitting the chaff and coffee to pass to an auxiliary grinding mill. The tailings proceed to a separate conveyor which transmits them back to the finishing rolls where they are reground. After the chaff and the finely divided coffee have passed through the auxiliary grinding mill, they are lead into the tailings elevator where they mix with the tailings and are passed again through the finishing rolls. If the chaff and the tailings have been sufficiently finely ground, they will pass through the sieve with the finished product, but if they are not fine enough they will repeat this circuit until such a condition has been reached. In passing through the auxiliary grinding mill, any finely ground coffee which is drawn up with the chaff will adhere to the surface of the chaff, thus combining to form granules or grains corresponding more in size to the coffee granules and effective in hiding the color of the chaff.

In Fig. 2 a similar apparatus is shown except that there are two sieves used, one called a grading sieve and another immediately below called a fines sieve. As the coffee and chaff pass on to the first or grading sieve only the tailings and coarse chaff are prevented from passing through this sieve; the finer chaff and ground coffee will pass through the grading sieve and fall on the fines sieve below. The tailings and the coarse chaff travelling down the surface of the grading sieve will pass beneath the chaff boot which will pick up the coarse chaff and some of the finer coffee and will pass this chaff and fine coffee to the collector and auxiliary grinder. The finer ground coffee and chaff which has passed through the grading sieve and fallen upon the fines sieve will then be further classified. The extra fine or pulverized coffee will pass through this second sieve, whereas the coffee which is not so finely ground or pulverized and the fine chaff will pass down this second sieve and beneath the auxiliary chaff boot which will pick up the chaff from the finely ground coffee or finished product and pass it to the collector together with some of the extra fine coffee which may not have passed through this sieve. This second form of apparatus provides a means whereby substantially all the chaff, the finer ground as well as the coarse, will be removed from the coffee and passed to the collector and auxiliary grinder. This is to enable the chaff and the coffee to be substantially entirely separated if such a condition is desired. The chaff thus removed may be returned to the coffee or not as the case may be. In any event no chaff is permitted to get into the finished product until it has been cut and ground to a predetermined degree of fineness.

The products issuing from the apparatus as finished products may be stored in bins. It may be given an additional mixing to more thoroughly mix up the coffee granules with the granules formed of the cut chaff and finely pulverized coffee. Since the chaff is fed from the auxiliary grinding mill back to the main apparatus at the same speed at which the beans are fed to the machine, the proportion of chaff in the finished product is substantially the same as the proportion in the bean.

The chaff may be removed from a definite amount of the granulated coffee, then ground, and instead of being continually mixed in the apparatus with the granulated coffee, it may be mixed in batches in its proper proportion. Operating on this principle, the finished goods would be fed to a batch mixer and the chaff from a definite batch of coffee, after being ground would be fed to this same mixer.

I claim:

1. Method of preparing coffee comprising mixing comminuted coffee with chaff ground separately to a desired degree of fineness and in substantially the same proportion as in the bean.

2. Method of preparing coffee comprising separating the coffee from the chaff, grinding the chaff separately from the coffee and then mixing the ground chaff with the coffee.

3. Method of preparing coffee comprising cracking the coffee bean to remove the chaff from within the bean, grinding the bean and the chaff, separating the chaff from the ground coffee, grinding the chaff, and then returning the ground chaff to the ground coffee.

4. Method of preparing coffee comprising cracking the coffee bean, grinding the chaff and the coffee, screening the fine chaff and fine coffee from the coarse chaff and the coffee tailings, separating the coarse chaff from the tailings, conveying the tailings back through the grinding rolls, separately grinding the chaff to a desired degree of fineness, and then conveying the separately ground chaff back into the tailings just before the tailings are reground.

5. A method of preparing coffee comprising separating the chaff and a portion of the finely ground coffee from the main portion of the coffee during the grinding process, grinding this chaff and coffee separate from the main portion of the coffee, and then mixing this additionally ground material with the main portion of the coffee.

6. A method of preparing coffee comprising cracking the coffee bean, grinding the chaff and the coffee, screening the fine chaff and fine coffee from the coarse chaff and the coffee tailings, separating the coarse chaff from the tailings, conveying the tailings back through the grinding rolls, subjecting the fine chaff and fine coffee to a second screening action, removing the fine chaff from the fine coffee, separately grinding the coarse and fine chaff to a desired degree of fineness and then conveying the separately ground chaff back into the tailings just before the tailings are reground.

7. A non-stratifying substantially homogeneous coffee product adapted for percolation comprising comminuted coffee combined with chaff separately ground to a desired size.

8. A non-stratifying substantially homogeneous coffee product adapted for percolation comprising cut coffee combined with chaff cut and separately ground to a desired size and in substantially the proportion occurring in the bean.

Signed at New York, in the county of New York, and State of New York, this 27th day of September A. D. 1926.

JOSEPH L. KOPF.